United States Patent

[11] 3,625,432

[72] Inventor Stephen L. Bragg
 Findern, England
[21] Appl. No. 5,016
[22] Filed Jan. 22, 1970
[45] Patented Dec. 7, 1971
[73] Assignee Rolls Royce Limited
 Derby, England
[32] Priority Jan. 31, 1969
[33] Great Britain
[31] 5,544/69

[54] APPARATUS FOR DEFLECTING GAS TURBINE ENGINE EXHAUST GASES
 7 Claims, 4 Drawing Figs.
[52] U.S. Cl. .................................................. 239/265.35,
 60/230, 181/33.222, 244/56
[51] Int. Cl. .................................................. B64c 15/04
[50] Field of Search ........................................... 239/265.19,
 265.33, 265.35; 181/33.222, 51; 60/230, 231, 232,
 271; 244/53, 54, 56

[56] References Cited
UNITED STATES PATENTS
3,392,529  7/1968  Pike et al. .................... 181/33.222 UX
3,495,682  2/1970  Treiber ......................... 181/51

Primary Examiner—Lloyd L. King
Assistant Examiner—Michael Y. Mar
Attorney—Cushman, Darby & Cushman ABSTRACT: A gas turbine jet propulsion engine has its turbine gas outlet angle and discharge nozzle plane coadapted to discharge the gas efflux from the nozzle at a specific angle to the engine axis. The discharge nozzle plane angle is obtained by merely chamfering the nozzle end face. The nozzle is rotatable about the engine axis and thus, thrust direction can be changed without physical deflection of the gas efflux with its attendant thrust losses.

Inventor
STEPHAN L. BRAGG

By Cushman Darby Cushman
Attorney

APPARATUS FOR DEFLECTING GAS TURBINE ENGINE EXHAUST GASES

This invention concerns gas turbine jet propulsion engines.

According the present invention there is provided a gas turbine jet propulsion engine having a straight annular jet pipe mounted coaxially thereon and wherein the turbine gas outlet is formed so as to discharge gas therefrom into the jet pipe at a first acute angle to the engine axis measured in a plane lying tangentially of the turbine disc and the jet pipe gas outlet is formed so as to always discharge the gas therefrom at a second, acute angle to said axis, which angle is substantially similar in magnitude to said first angle and causes the gas to provide a resultant thrust which acts substantially normal to the plane containing the jet pipe outlet.

Preferably the gas discharge angle from the turbine outlet is obtained by arranging the turbine blades in a position which, combined with the speed of flow of the gas through the turbine and the rate of rotation of the turbine, causes the gas to be discharged from the turbine, into the jet pipe, at said angle.

Preferably the gas discharge angle from the jet pipe is obtained by forming the jet pipe outlet in a plane which lies at an acute angle to the engine axis.

Preferably the engine and jet pipe are relatively rotatable.

Preferably, though not restrictively, the engine and jet pipe are adapted for mounting within the structure of an aircraft.

Preferably the engine and jet pipe are mounted with their common axis at an acute angle to the axis of the aircraft.

The invention will now be described with reference to the accompanying drawings in which.

Figure 1:
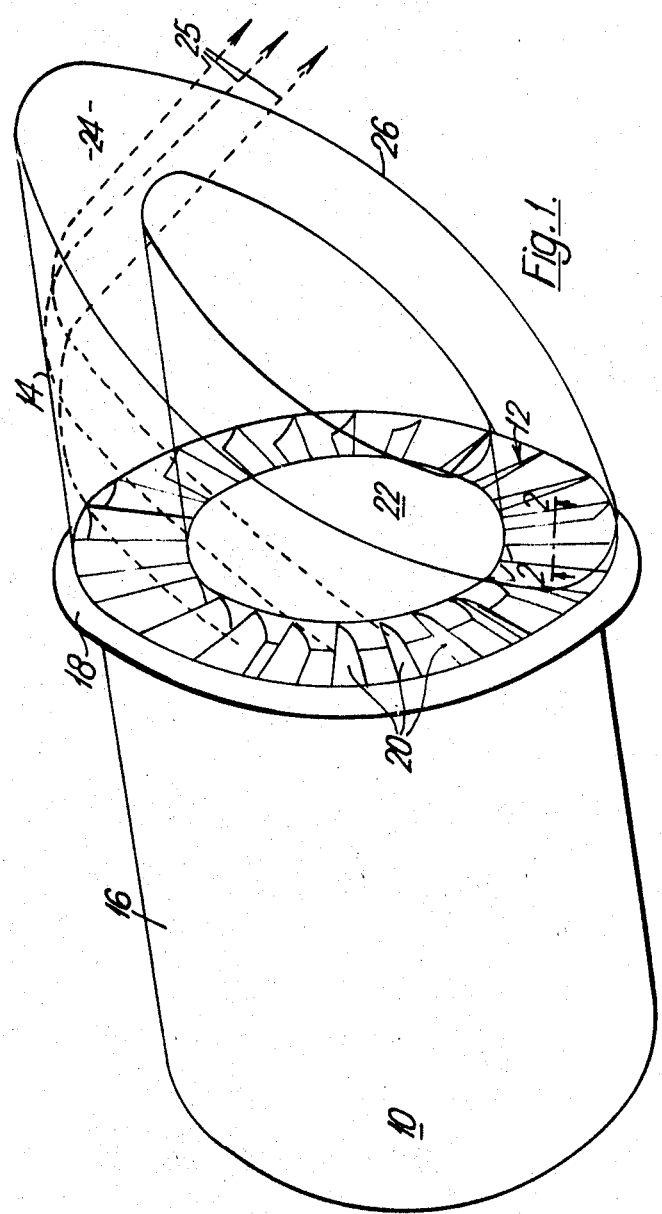
FIG. 1 is a pictorial view of an engine and jet pipe.

In FIG. 1 a gas turbine jet propulsion engine 10 comprises a compressor, combustion equipment and an expansion turbine 12, in flow series and of which only the expansion turbine 12 is shown.

A jet pipe 14 is rotatably attached to the downstream end of engine 10, that is, downstream relative to the flow of gases through the engine.

Rotation of jet pipe 14 is made possible by the provision of a bearing arrangement in which the engine outer casing 16 forms the inner race thereof and the upstream end of the jet pipe forms the outer race thereof, as indicated at 18. Rotation may be caused by any convenient means.

Figure 2:
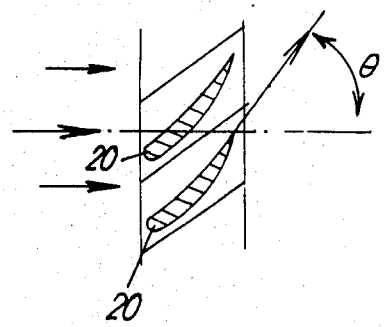
FIG. 2 is a part section on line 2—2 of FIG. 1.

Expansion turbine 12 comprises a plurality of turbine blades 20 equiangularly spaced about the rim of a turbine disc 22. Gases from the combustion equipment expand through the blades 20 and its reaction thereon causes the blades to impart a rotary movement to disc 22 as is well known. However, the blades of the present invention are set at a particular angle $\theta$ to the axis of the engine 10 as will be seen in FIG. 2. The setting of the blades thus deflects the gas flowing therethrough and imparts to it a swirling motion, which causes the gas to enter the annulus 24 of jet pipe 14 on a helical path. The fact that jet pipe 14 is annular and not merely a hollow cylinder, is important in that the confining walls of the annulus 24 maintain the gas on its helical path until it reaches the jet pipe outlet 26.

Figures 3, 4:
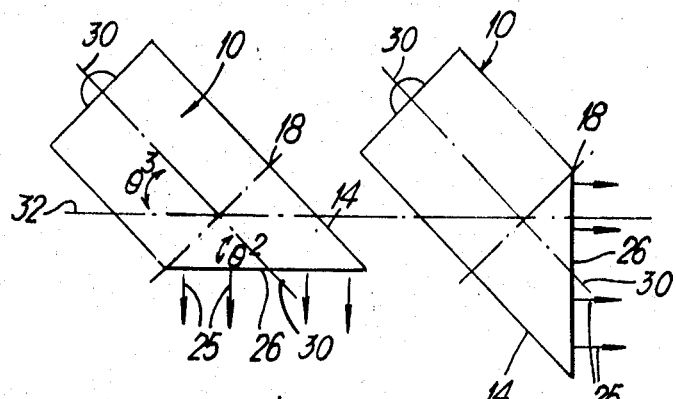
FIG. 3 is a diagrammatic view of an engine and jet pipe shown in FIG. 1.
FIG. 4 is a further diagrammatic view of an engine and jet pipe shown in FIG. 1.

References to FIGS. 1, 3 and 4 shows that the outlet 26 is formed by cutting jet pipe 14 at an acute angle to the engine axis, which angle $\theta''$, in the present example, is substantially similar in magnitude to angle $\theta$. Thus, as the arrows 25 in FIG. 1 show, gas flowing from turbine 12, at exit angle $\theta$ swirls around the annulus 24 and leaves outlet 26 as shown at 25 substantially normal to the plane containing outlet 26. In order to ensure that the gas is still at its maximum or near maximum swirl when leaving outlet 26, the outlet is formed as closely as possible to turbine 12. This arrangement provides the advantage of a very short, lightweight jet pipe.

The major advantage gained from the arrangement as described is that on discharge of the gas from jet pipe 14 a change in the direction of gas flow is obtained, relative to its direction of flow through the engine, without having to present a physical obstruction to the gas flow, such as a deflector wall or bent elbow-type jet pipe. Thus the thrust losses which are inevitable when physical deflection is used, are at least substantially obviated. An engine arrangement as described herein is therefore eminently suitable for installation in an aircraft which is required to have short and/or vertical takeoff and landing capabilities. The engine and jet pipe would be mounted in the aircraft as shown in FIGS. 3 and 4, that is, with their common axis 30 at an angle $\theta^2$ to the roll axis of the aircraft, which angle is also similar in magnitude to angle $\theta$.

In this specific example, angle $\theta$ is 45°. Reference to the drawings shows that the gas leaves the turbine 12 at 45° to the engine axis and at 45° to a line drawn tangentially of the turbine. The gas then swirls around the annulus 24 of jet pipe 14 and then passes therefrom substantially normal to the plane containing the outlet 26, but at 45° to the engine axis 30.

Engine 10 would be mounted at an angle $\theta^3$ (again, similar in magnitude to $\theta$) to the roll axis 32 of the aircraft and this means of course that the gas is flowing normally to axis 32 and is thereby providing a downwardly directed thrust as shown in FIG. 3.

In FIG. 4 engine 10 is still mounted with its axis 30 at 45° to axis 32 but jet pipe 14 has been rotated through 180° about axis 30, thus causing gas to flow therefrom, parallel thereto, so providing rearwardly directed thrust for forward propulsion of the aircraft.

It will be seen from the foregoing description that thrust vectoring is achieved with the absolute minimum of moving parts which permits a rigid structure, and no physical gas deflection means, which substantially obviates thrust losses. Furthermore, an engine and jet pipe of the type described are eminently suitable for mounting in the rear of an aircraft fuselage, in which position, the jet pipe may be rotated so as to control the yaw and pitch angles of the aircraft.

What we claim is:

1. A gas turbine jet propulsion engine having a straight annular jet pipe mounted thereon, said engine and said jet pipe having a common axis, said engine having a turbine comprising a turbine disc with turbine blades mounted thereon and forming a turbine gas outlet, said turbine gas outlet being formed to discharge gas therefrom into said jet pipe at a first acute angle to said common axis measured in a plane lying tangentially of said turbine disc, and said jet pipe having a jet pipe gas outlet formed to always discharge gas therefrom at a second acute angle to said common axis, said second acute angle being substantially similar in magnitude to said first acute angle and causing the gas to provide a resultant thrust which acts substantially normal to a plane containing said jet pipe outlet.

2. An engine as claimed in claim 1 wherein the first, acute angle is substantially 45°.

3. An engine as claimed in claim 1 wherein the second, acute angle is substantially 45°.

4. An engine as claimed in claim 1 wherein the engine and jet pipe are relatively rotatable.

5. An engine as claimed in claim 1 wherein at least one said engine is adapted for mounting in an aircraft.

6. An engine as claimed in claim 5 wherein the at least one engine is mounted at an acute angle to the roll axis of the aircraft.

7. An engine as claimed in claim 6 wherein said angle is substantially 45°.

* * * * *